(12) United States Patent
Kumar K. A.

(10) Patent No.: US 8,953,770 B2
(45) Date of Patent: Feb. 10, 2015

(54) RETURNING MISSED PHONE CALLS

(75) Inventor: Pradeep Kumar K. A., Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 85 days.

(21) Appl. No.: 13/366,987

(22) Filed: Feb. 6, 2012

(65) Prior Publication Data

US 2013/0202099 A1 Aug. 8, 2013

(51) Int. Cl.
*H04M 3/42* (2006.01)

(52) U.S. Cl.
USPC .................................. 379/216.01; 379/142.06

(58) Field of Classification Search
CPC .................................................. H04M 3/42195
USPC ....................................................... 379/216.01
See application file for complete search history.

(56) References Cited

U.S. PATENT DOCUMENTS

| | | | |
|---|---|---|---|
| 2004/0141599 A1* | 7/2004 | Tang et al. | 379/93.24 |
| 2011/0110510 A1* | 5/2011 | Toebes | 379/142.06 |
| 2011/0176670 A1* | 7/2011 | Kaplan et al. | 379/210.01 |

* cited by examiner

*Primary Examiner* — Amal Zenati

(57) ABSTRACT

In one embodiment, a method is provided for returning missed phone calls. In this method, a missed phone call is detected and a phone number associated with the missed phone call is identified. A physical button located on an apparatus is assigned to the phone number. An indication that the missed phone call is associated with the physical button is initiated and after which, a single selection of the physical button is detected. A phone call to the phone number is then initiated in response to the detection of the single selection.

15 Claims, 10 Drawing Sheets

US 8,953,770 B2

RETURNING MISSED PHONE CALLS

FIELD

The present disclosure relates generally to phone systems.

BACKGROUND

A missed phone call is a telephone call that is not answered by its intended recipient. Many conventional phones, especially landline phones, provide a large number of functionalities, which can be accessed through various menus and submenus. For example, to return a missed phone call, a user using a particular type of conventional phone needs to select a directories button to enter a directories menu. From the directories menu, the user then needs to select another button to enter a missed phone call directory, which lists all the missed phone calls. The user then needs to scroll through the missed phone call directory to identify and return a particular missed call. The large number of selections on a phone to simply return a missed phone call is complicated and labor intensive, which may hinder a user from using such a functionality.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

A method is provided for returning missed phone calls. In this method, a missed phone call is detected and a phone number associated with the missed phone call is identified. A physical button located on an apparatus is assigned to the identified phone number. An indication that the missed phone call is associated with the physical button is initiated, after which a single selection of the physical button is detected. A phone call to the phone number is then initiated in response to the detection of the single selection.

Example Embodiments

Figure 1:
FIG. 1 is a diagram depicting a phone apparatus that includes a functionality to quickly return missed phone calls, in accordance with an example embodiment.

FIG. 1 is a diagram depicting a phone apparatus 100 that includes a functionality to quickly return missed phone calls, in accordance with an example embodiment. As depicted, the phone apparatus 100 includes a display screen 102 and multiple physical buttons 104 proximate to the display screen 102. If a user missed a phone call, the phone apparatus 100 identifies a phone number associated with the missed phone call and assigns one of the physical buttons 104 to the missed phone call. In the example depicted in FIG. 1, the phone apparatus 100 can assign physical button 104' to the missed phone call.

The phone apparatus 100 then initiates an indication that the missed phone call is assigned to the physical button 104'. For example, as depicted in FIG. 1, the phone apparatus 100 displays a "Missed Call" message on the display screen 102 next to the physical button 104' that indicates to a user that the physical button 104' is assigned to the missed phone call. As a result, a user can quickly and easily return the missed phone call by selecting physical button 104'.

Figure 2:
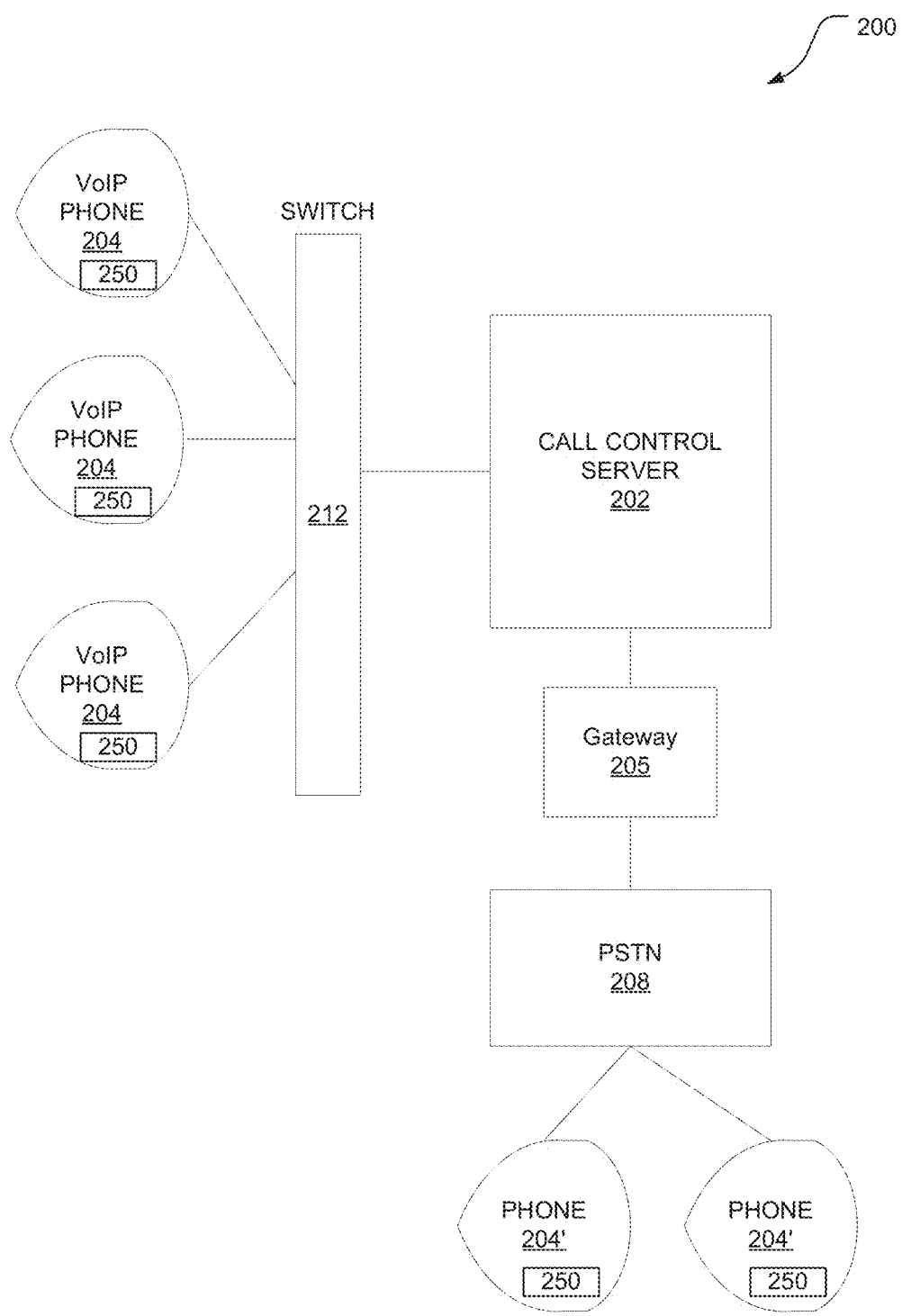
FIG. 2 is a simplified diagram of a communication system, in accordance with an example embodiment.

FIG. 2 is a simplified diagram of a communication system 200, in accordance with an example embodiment. This communication system 200 includes a call control server 202 that is connected to a gateway 205 and a switch 212. The switch 212, in turn, is connected to multiple voice over Internet Protocol (VoIP) phone apparatuses 204. The gateway 205 is connected to a public switched phone network (PSTN) 208, which is connected to phone apparatuses 204'. In general, each phone apparatus 204 and 204' is a piece of telecommunication equipment. Examples of communication devices include landline phones, cordless phones, mobile phones, VoIP phones, and computers.

The call control server 202 is generally configured to manage and facilitate phone calls made to and from each phone apparatus 204 and 204'. An example of a call control server 202 is an IP call control server, which provides various VoIP services. Examples of VoIP services include contact routing, call treatment, network-to-desktop computer telephony integration (CTI), and multichannel contact management over an IP infrastructure. The call control server 202 can be hosted on one or more server computers and, as explained in more detail below, can also analyze and modify phone numbers, if necessary, to accommodate communication systems, such as communication system 200, that utilize phone prefixes.

As depicted, the PSTN 208 is in communication with the call control server 202 by way of the gateway 205. The PSTN 208 is a collection of interconnected systems operated by phone companies and can be also referred to as a Plain Old Phone System (POTS). The gateway 205 provides voice interoperability between computer and non-computer networks, such as PSTN 208, by bridging phone transmissions to IP multicast streams.

In the example embodiment depicted in FIG. 2, each phone apparatus 204 and 204' can host a missed call module 250. As explained in more detail below, each missed call module 250 can assign a missed phone call to a physical button on each phone apparatus 204 and 204' to facilitate returns of missed phone calls.

Figure 3:
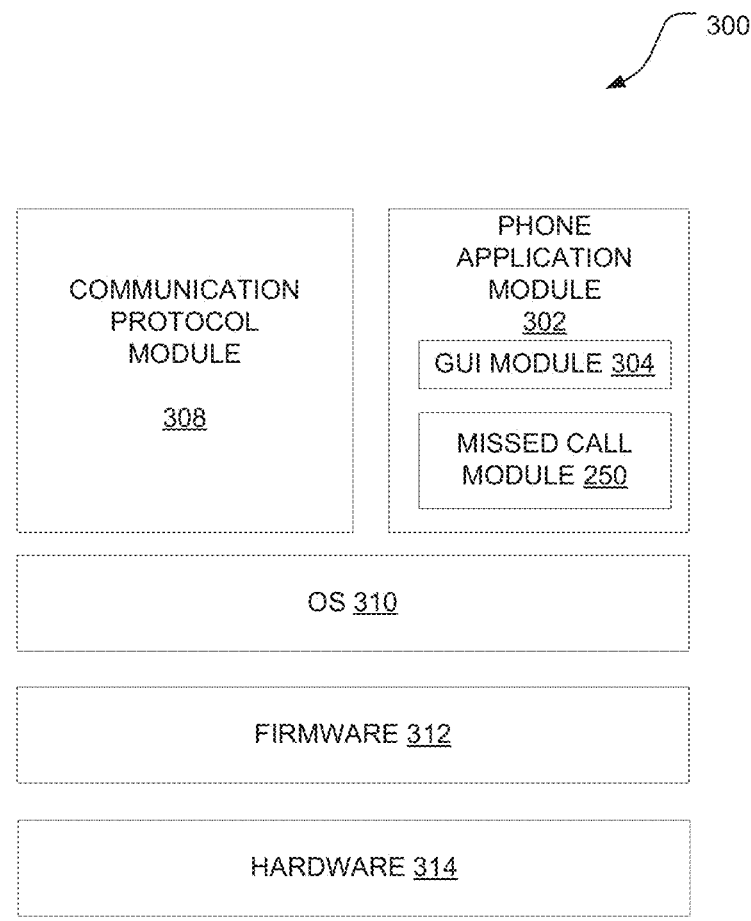
FIG. 3 is a block diagram depicting an overall architecture of a phone apparatus that is configured to return missed phone calls, in accordance with an example embodiment.

FIG. 3 is a block diagram depicting an overall architecture of a phone apparatus 300 that is configured to return missed phone calls, in accordance with an example embodiment. The phone apparatus 300 may be one of the components in a communication system, such as the communication system 200 depicted in FIG. 2. In various embodiments, the modules 302, 304, 308, and 250 depicted in FIG. 3 may be used to implement computer programs, logic, applications, methods, processes, or software to return missed phone calls, as described in detail below.

This example of the phone apparatus 300 includes hardware 314, firmware 312, an operating system 310, a communication protocol module 308, and a phone application module 302. The firmware 312 is a fixed programs that internally controls the various hardware 314 included in the phone apparatus 300. The operating system 310 manages various processes executing on the phone apparatus 300, examples of which include a communication protocol module 308 and a phone application module 302. It should be appreciated that the communication protocol module 308 provides support for various communication protocols, such as Skinny Call Control Protocol (SCCP) and Session Initiation Protocol (SIP).

Generally, the phone application module 302 is configured to provide basic call functionalities mu well as other calling features, such as call forwarding, redials, call holding, and muting. In the example embodiment depicted in FIG. 3, the phone application module 302 includes a graphical user interface (GUI) module 304 and a missed call module 250. The missed call module 250 is configured to assign a physical button to return a missed phone call. A "physical button," as used herein, refers to a hardware component that can be pressed to activate an electric circuit on a phone apparatus. As explained in detail below, the missed call module 250 can, for example, detect a missed phone call, identify the phone number associated with the missed phone call, and initiate an indication that the missed phone call is associated with a particular physical button. In one embodiment, the GUI module 304 is configured to display such an indication, as described in detail below.

It should be appreciated that in other embodiments, the phone apparatus 300 my include fewer or more modules apart from those shown in FIG. 3. For example, in an alternate embodiment, the missed call module 250 can be further divided into multiple modules. The modules 302, 304, 308, and 250 may be in the form of software that is processed by a processor. In another example, as explained in more detail below, the modules may be in the form of firmware that is processed by applications specific integrated circuits (ASIC), which may be integrated into a circuit board. Alternatively, the modules may be in the form of one or more logic blocks included in a programmable logic device (e.g., a field programmable gate array). The described modules may be adapted, and/or additional structures may be provided, to provide alternative or additional functionalities beyond those specifically discussed in reference to FIG. 3. Examples of such alternative or additional functionalities will be discussed in reference to the flow diagrams discussed below.

Figure 4:
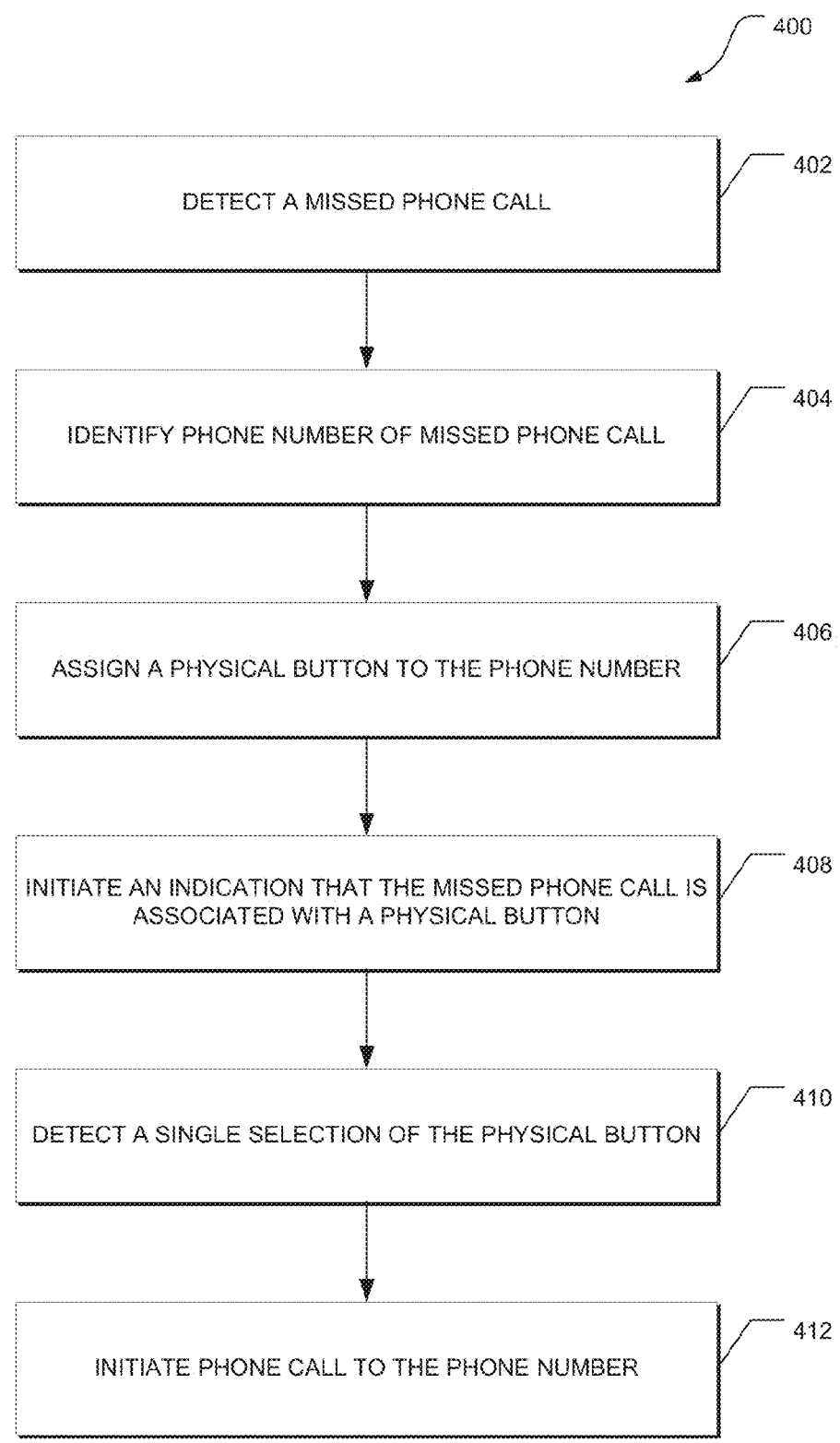
FIG. 4 is a flow diagram depicting a general overview of a method, in accordance with an example embodiment, for returning missed phone calls.

FIG. 4 is a flow diagram depicting a general overview of a method 400, in accordance with an example embodiment, for returning missed phone calls. In an example embodiment, the method 400 may be implemented by the missed call module 250 and employed in the phone apparatus 300 depicted in FIG. 3. In reference to FIG. 4, the missed call module, at 402, initially detects the missed phone call. Upon detection, the missed call module, at 404, identifies the phone number associated with the missed phone call. As explained in detail below, the phone number can be identified by receiving a message that includes the phone number.

With the phone number identified, the missed call module, at 406, assigns a physical button to the phone number. As explained in more detail below, the physical button can be predefined or dynamically assigned upon receipt of the missed phone call. The missed call module or a different module then initiates, at 408, an indication that the missed phone call is associated with a physical button. As used herein, an "indication" refers to a visual and/or auditory signal that serves to indicate an association of a physical button to a missed phone call. In one embodiment, an indication is a message displayed on a display screen. In another embodiment, an indication can be an illumination of a component on a phone apparatus.

After the missed call module initiates the indication, a user can select the physical button once to return the missed call. Selection can be made by, for example, touching the physical button, pressing the physical button, or performing other actions on the physical button. In particular, the missed call module, at 410, detects this single selection of the physical button and in response, initiates, at 412, a phone call to the phone number associated with the missed call. As used herein, a "single selection" refers to a user activating or performing an action on one of a number of physical buttons only once. This single selection is made by a user without selecting other physical buttons. That is, the user can return missed phone calls by performing just a single action on a phone apparatus. Accordingly, such an association provides a user with a quick and easy way to return a missed phone call. For example, instead of a user having to go through several menus and sub-menus to locate the phone number associated with the missed call, the user can press a single physical button to dial the phone number.

Figure 5A:
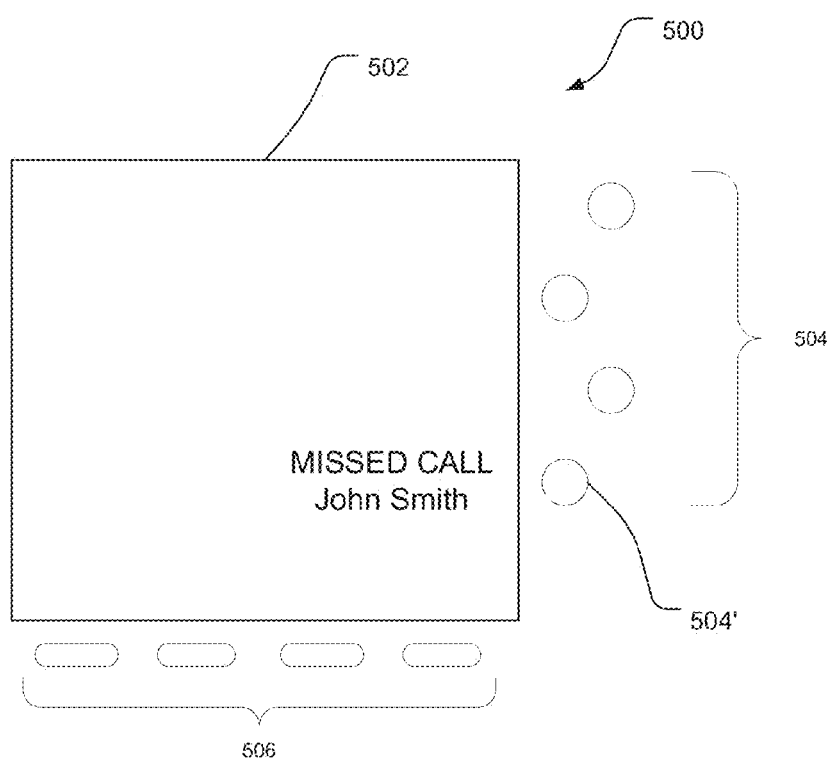
FIGS. 5A, 5B, and 5C are diagrams illustrating examples of phone features that a user can select to return a missed phone call, in accordance with some example embodiments.
Figure 5B:
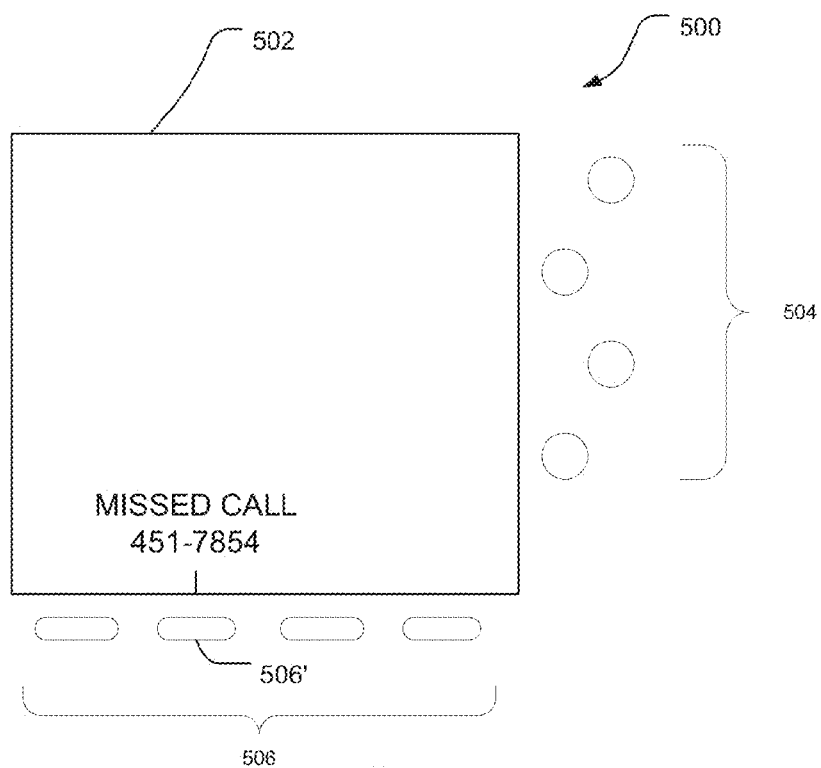
Figure 5C:
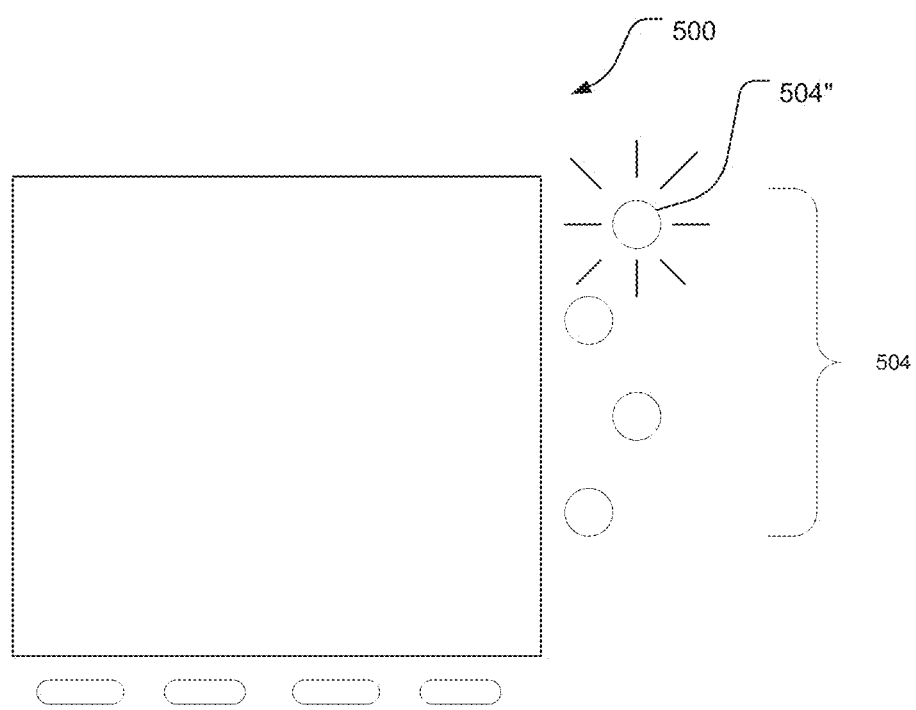

FIGS. 5A, 5B, and 5C are diagrams illustrating examples of phone features that a user can select to return a missed phone call, in accordance with some example embodiments. In the embodiment depicted in FIG. 5A, a phone apparatus 500 includes a display screen 502 and various physical buttons 504 and 506 proximate to the display screen 502. The physical buttons 504 are associated with speed dial functionality. That is, the physical buttons 504 are speed dial buttons. It should be appreciated that speed dial is a function that allows a user to place a call by pressing a reduced number of keys.

In this example, a user stores a phone number in the phone apparatus 500 and can assign the phone number of a recipient ("John Smith") to one of the speed dial physical buttons 504'. The user can quickly place a phone call to the recipient by selecting the speed dial physical button 504'. Additionally, as depicted in FIG. 5A, if the user missed a phone call from the same recipient, the phone apparatus 500 identifies the phone number of the recipient and, given that the recipient's phone number is already pre-programmed, identifies the speed dial physical button 504' that is assigned to the phone number. In this embodiment, the phone apparatus 500 then displays an indication in the form of a message "MISSED CALL John Smith" on the display screen 502 immediately next to the speed dial physical button 504' to indicate the association of the speed dial physical button 504' to the recipient who originated the missed phone call. Upon being notified of the missed phone call, a user can return the missed phone call by selecting the speed dial physical button 504' once without having to select any other physical buttons 504 (excluding 504') and 506.

FIG. 5B depicts another embodiment for returning missed phone calls. Instead of using the speed dial physical buttons 504, the phone apparatus 500 can assign the missed phone call to one of the soft key physical buttons 506. A "soft key," as used herein, refers to a physical button that is flexibly programmable to invoke any number of functions rather than being associated with a single fixed function or a fixed set of functions. Here, upon detection of a missed phone call, the phone apparatus 500 identifies the phone number of the recipient (e.g., 451-7854) that initiated the missed phone call and assigns the soft key physical button 506' to the missed phone call.

Additionally, as depicted in FIG. 5B, the phone apparatus 500 then displays an indication in the form of a message "MISSED CALL 451-7854" on the display screen 502 immediately next to the soft key physical button 506' to indicate the association of the physical button 506' to the recipient that originated the missed phone call. Upon being notified of the missed phone call, a user can return the missed phone call by just selecting the soft key physical button 506' once without having to select any other physical buttons 504 and 506 (excluding 506').

FIG. 5C depicts yet another embodiment for returning missed phone calls. In this example, each speed dial physical button 504 is configured to illuminate. Upon detection of a missed phone call, the phone apparatus 500 identifies the phone number of the recipient and, given that the recipient's phone number is already pre-programmed, identifies the speed dial physical button 504" that is assigned to the phone number of the recipient.

In this embodiment, the phone apparatus 500 then initiates an indication by illuminating the speed dial physical button 504" to indicate the association of the speed dial physical button 504" to the recipient that originated the missed phone call. Upon being notified of the missed phone call, a user can return the missed phone call by selecting the speed dial physical button 504" once without having to select any other physical buttons 504 (excluding 504") and 506.

Figure 6:
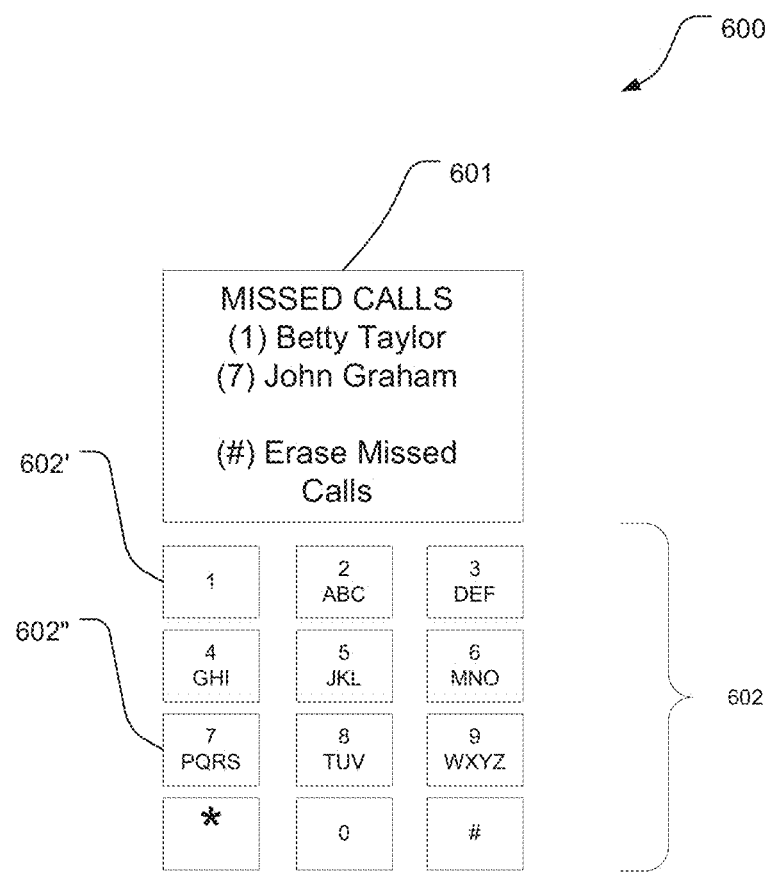
FIG. 6 is a diagram illustrating yet another alternate example of phone features that a user can select to return a missed phone call, in accordance with a different example embodiment.

FIG. 6 is a diagram illustrating yet another alternate example of phone features that a user can select to return a missed phone call, in accordance with a different example embodiment. As depicted, a phone apparatus 600 includes a display screen 601 and a number of physical buttons 602 for use as a numeric keypad. In this example, a user can store phone numbers in the phone apparatus 600 and can also assign each physical button 602 to one of the stored phone numbers. In effect, the keypad physical buttons 602 also provide speed dial functionality where the user can quickly place a phone call by, for example, pressing and holding one of the physical buttons 602.

If the user missed a phone call from a recipient, the phone apparatus 600 identifies the phone number of the recipient and, given that the recipient's phone number is already pre-programmed, identifies one of the physical buttons 602 that is assigned to the phone number of the recipient. For example, the phone apparatus 600 can identify that phone numbers of two recipients "Betty Taylor" and "John Graham" that made the missed phone calls are assigned to physical buttons 602' and 602", respectively. The phone apparatus 600 then displays indications in the form of messages "Betty Taylor" and "John Graham" on the display screen 601 with numerical numbers (1) and (7) assigned to physical buttons 602' and 602", respectively, to indicate the association of the physical buttons 602' and 602" to the recipients that originated the missed phone calls. Upon being notified of the missed phone call, a user can return the missed phone call to one of the recipients by selecting the physical button 602' or 602" once without having to select any other physical buttons 602 (excluding 602' and 602").

Figure 7:
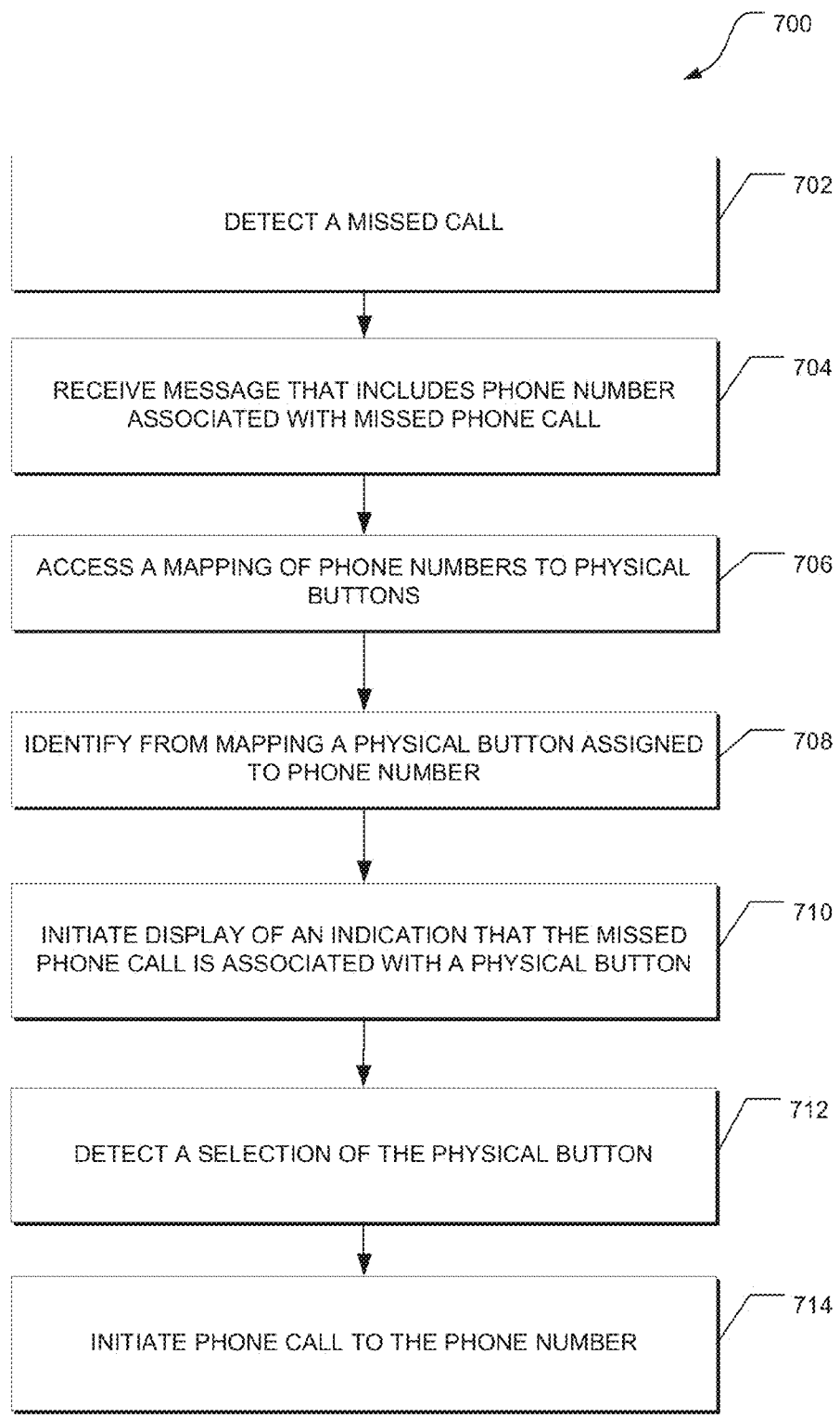
FIG. 7 is a flow diagram depicting a detailed overview of a method, in accordance with an example embodiment, for returning missed phone calls.

FIG. 7 is a flow diagram depicting a detailed overview of a method 700, in accordance with an example embodiment, for returning missed phone calls. In an example embodiment, this method 700 may be implemented by the missed call module 250 and GUI module 304 employed in the phone apparatus 300 depicted in FIG. 3. In reference to FIG. 7, the missed call module, at 702, initially detects a missed phone call. Upon detection, the missed call module identifies the phone number associated with the missed phone call, in one embodiment, as depicted at 704, the phone number can be identified by receiving a message from a call control server that includes the phone number. It should be noted that a message received from the call control server can, in one example, include two fields reserved for different phone numbers. One field is a "called party number" field and the second field is a "calling party number" field. The called party number field stores a directory number of a destination phone. The calling party number field stores a directory number of a source phone.

With the phone number associated with the missed phone call identified, the missed call module, in one embodiment, then accesses a mapping of phone numbers to physical buttons at 706. The mapping is a data structure that stores associations between phone numbers and physical buttons. For example, the mapping can be in the form of a table that stores all the phone numbers that are assigned to speed dial physical buttons. With access to this mapping, the missed call module can identify, at 708, one of the physical buttons assigned to the phone number associated with the missed call. If the missed call module identifies that the phone number has not been assigned to any physical button, then the missed call module identifies one of the physical buttons that has not been assigned and assigns the physical button accordingly. In an alternate embodiment, if a mapping is not available, the missed call module can dynamically assign any one of a number of physical buttons to the missed phone call.

Thereafter, the GUI module, as an example, can initiate a display, at 710, of an indication that the missed phone call is associated with one of the physical buttons. As described above, in one embodiment, the indication can be a message displayed on the display screen. Upon seeing this indication, the user can select the physical button assigned to the missed phone call and, upon detection of the selection of the physical button at 712, the missed call module can then automatically initiate a phone call to the phone number at 714.

Figure 8:
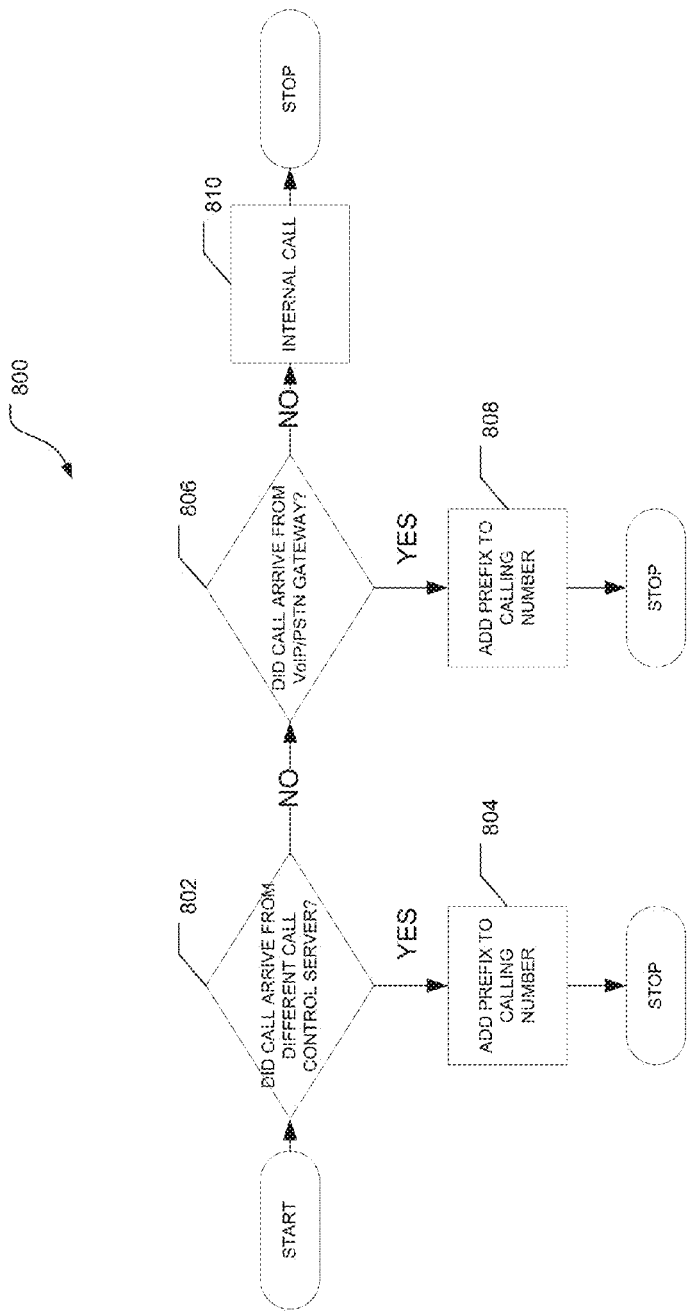
FIG. 8 is a flow diagram of a general overview of a method, in accordance with an embodiment, for modifying a phone number for use in returning missed phone calls.

FIG. 8 is a flow diagram of a general overview of a method 800, in accordance with an embodiment, for modifying a phone number for use in returning missed phone calls. In an example embodiment, the method 800 may be implemented by the call control server 202 depicted in FIG. 2. In reference to FIG. 8, it should be appreciated that a call control server may impose the addition of certain prefix numbers for outside or external calls. As used herein, an "external call" refers to a phone call that is extended to an end point managed by a different call control server. In contrast, an "internal call" refers to a call that is destined to an end point managed by the same call control server. For example, to make an external call, phone apparatuses within an organization may require the addition of an "8" prefix number before the phone number. To accommodate prefix numbers, a call control server may implement the method 800 described in FIG. 8.

In one example embodiment, a call control server obtains a mapping of prefix numbers to a phone apparatus that has been designated for routing. From the mapping, the call control server identifies a prefix number associated with the phone apparatus. As depicted at 802, the call control server then checks whether a missed phone call originated from a different call control server. If the phone call originated from a different call control server, then the call control server automatically, at 804, appends the prefix number to the calling party number field, which was discussed previously.

However, if the phone call originated from the same call control server, then the call control server checks, at 806, whether the phone call arrived from a VoIP/PSTN gateway. If the phone call originated from a VoIP/PSTN gateway, then the call control server automatically, at 808, appends the prefix number to the calling party number field.

If the phone call did not originate from a different call control server and did not arrive from a VoIP/PSTN gateway, then the call control server, at 810, identifies the phone call to be an internal call and therefore, does not modify the calling party number field.

Figure 9:
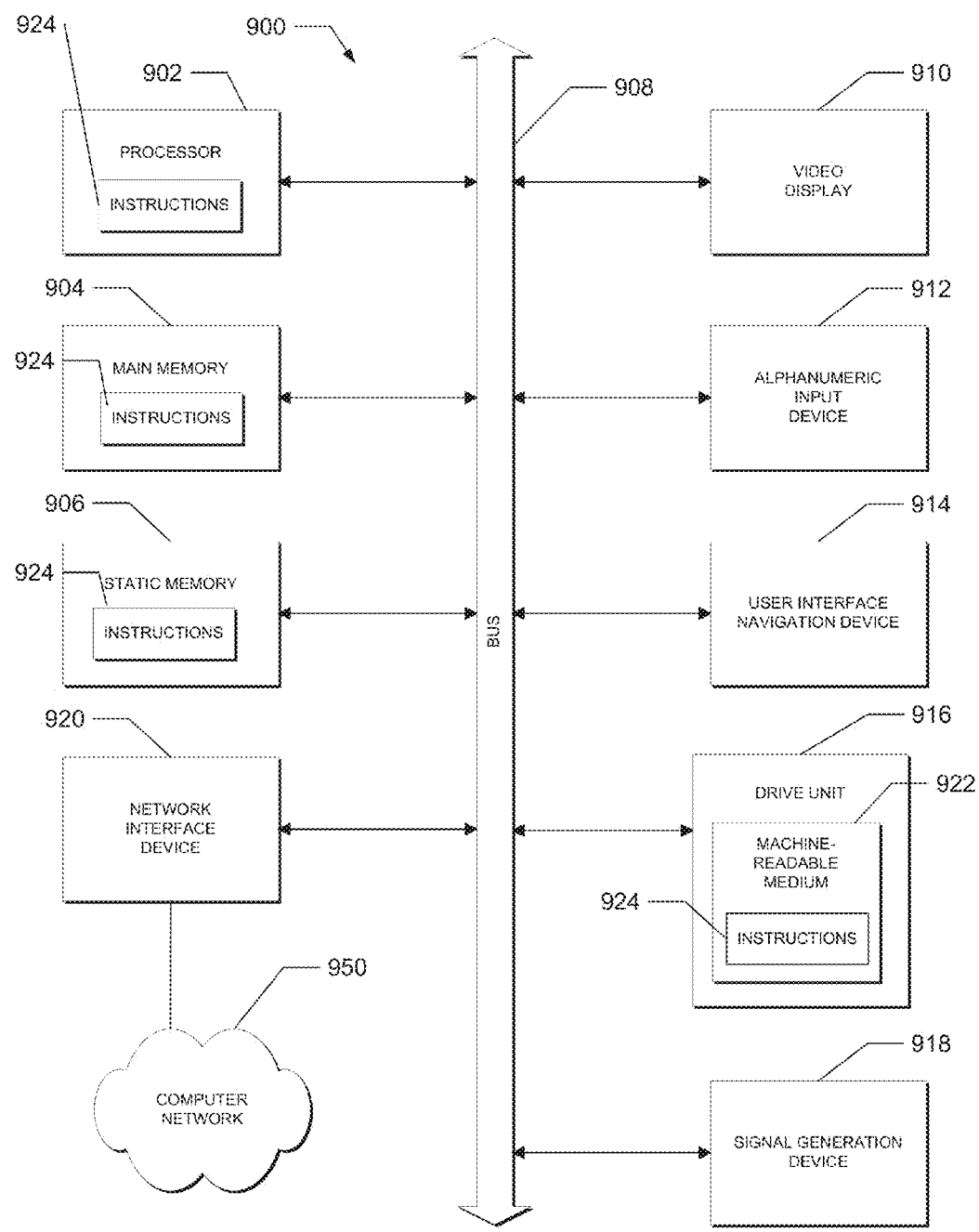
FIG. 9 depicts a block diagram of a machine in the example form of a phone apparatus within which may be executed a set of instructions for causing the machine to perform any one or more of the methodologies discussed herein.

FIG. 9 depicts a block diagram of a machine in the example form of a phone apparatus 900 within which may be executed a set of instructions for causing the machine to perform any one or more of the methodologies discussed herein. The machine is connected (e.g., networked) to other machines. The machine is capable of executing a set of instructions (sequential or otherwise) that specify actions to be taken by that machine The example of the phone apparatus 900 includes a processor 902 (e.g., a central processing unit (CPU), a graphics processing unit (GPU) or both), a main memory 904 (e.g., random access memory), and a static memory 906 (e.g., static random-access memory), which communicate with each other via bus 908. The phone apparatus 900 may further include display screen unit 910 (e.g., a liquid crystal display (LCD)). The phone apparatus 900 also includes an alphanumeric input device 912 (e.g., a numeric keypad), a user interface (UI) navigation device 914 (e.g., a trackball or physical buttons), a disk drive unit 916, a signal generation device 918 (e.g., a speaker), and a network interface device 920.

The disk drive unit 916 (a type of non-volatile memory storage) includes a machine-readable medium 922 on which is stored one or more sets of data structures and instructions 924 (e.g., software) embodying or utilized by any one or more of the methodologies or functions described herein. The data structures and instructions 924 may also reside, completely or at least partially, within the main memory 904 and/or within the processor 902 during execution thereof by phone apparatus 900, with the main memory 904 and processor 902 also constituting machine-readable, tangible media.

The data structures and instructions 924 may further be transmitted or received over a computer network 950 via network interface device 920 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the phone apparatus 900) or one or more hardware modules of a computer system (e.g., a processor 902 or a group of processors) may be configured by software (e.g., an application or application portion) as a hardware module that operates to perform certain operations as described herein.

In various embodiments, a hardware module my be implemented mechanically or electronically. For example, a hardware module may comprise dedicated circuitry or logic that is permanently configured (e.g., as a special-purpose processor, such as a field programmable gate array (FPGA) or an ASIC) to perform certain operations. A hardware module may also comprise programmable logic or circuitry (e.g., as encompassed within a general-purpose processor 902 or other programmable processor) that is temporarily configured by software to perform certain operations. It will be appreciated that the decision to implement a hardware module mechanically, in dedicated and permanently configured circuitry, or in temporarily configured circuitry configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 902 configured using software, the general-purpose processor 902 may be configured as respective different hardware modules at different times. Software may accordingly configure a processor 902, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 902 or processor-implemented modules. The performance of certain of the operations may be distributed among the one or more processors 902, not only residing within a single machine, but deployed across a number of machines. In some example embodiments, the processors 902 may be located in a single location (e.g., within a home environment, an office environment or as a server farm), while in other embodiments the processors 902 may be distributed across a number of locations.

While the embodiment(s) is (are) described with reference to various implementations and exploitations, it will be understood that these embodiments are illustrative and that the scope of the embodiment(s) is not limited to them. In general, techniques for returning missed phone calls may be implemented with facilities consistent with any hardware system or systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. An apparatus comprising:
    a display screen;
    physical buttons proximate the display screen, wherein the physical buttons are configured to illuminate;
    a processor connected to the display screen and the physical buttons; and
    a memory in communication with the processor, the memory being configured to store a phone module that is executable by the processor, the phone module having instructions that when executed by the processor, cause operations to be performed, the operations comprising:
        associating each of a plurality of the physical buttons with one of a plurality of phone numbers stored in the apparatus such that a single selection of a physical button initiates a phone call to the associated phone number;
        detecting a missed phone call;
        identifying a phone number associated with the missed phone call as a missed phone number;
        determining that the missed phone call originated from a call control server different from a call control server associated with the apparatus;
        identifying a prefix number associated with the apparatus;
        appending the prefix number to the missed phone number;
        dynamically assigning the missed phone number and the appended prefix to one of the physical buttons such that a single selection of the one physical button initiates a call to the prefix number and the missed phone number;
        initiating an indication that the missed phone call is assigned to the one physical button, wherein the indication includes an illumination of the one physical button, a display of the missed phone number on the display screen, and an identification, at the display screen, of the one physical button assigned to the missed phone number;
        detecting a single selection of the one illuminated physical button; and
        initiating a phone call to the missed phone number in response to the detection of the single selection of the illuminated physical button.

2. The apparatus of claim 1, wherein the single selection is made without the other physical buttons being associated.

3. The apparatus of claim 1, wherein the operation of the determining that one of the plurality of physical buttons is associated with the missed phone number comprises:
    accessing a mapping of phone numbers assigned to a number of the physical buttons; and
    identifying, from the mapping, the one physical button assigned to the missed phone number.

4. The apparatus of claim 1, further comprising:
    detecting a second missed phone call;
    identifying a phone number associated with the second missed phone call as a second missed phone number;
    determining that the second missed phone call originated from a call control server that is not associated with the apparatus;
    identifying a prefix number associated with the apparatus; and
    appending the prefix number to the second missed phone number;
    dynamically assigning the second missed phone number and the appended prefix to a second physical button such that a single selection of the second physical button initiates a call to the prefix number and the second missed phone number.

5. The apparatus of claim 1, wherein the operation of identifying the missed phone number comprises receiving a message that includes the missed phone number from a telecommunication server.

6. The apparatus of claim 1, wherein the plurality of physical buttons are associated with speed dial functionalities.

7. Software encoded on one or more non-transitory, computer-readable media, which when executed causes operations to be performed, the operations comprising:
    associating each of a plurality of physical buttons of the phone apparatus with one of a plurality of phone numbers stored in the phone apparatus such that a single selection of a physical button initiates a phone call to the associated phone number;
    detecting a missed phone call;
    identifying a phone number associated with the missed phone call as a missed phone number;
    determining that the missed phone call originated from a call control server different from a call control server associated with the phone apparatus;
    identifying a prefix number associated with the phone apparatus;
    appending the prefix number to the missed phone number;
    dynamically assigning the missed phone number and the appended prefix to one of the physical buttons such that a single selection of the one physical button initiates a call to the prefix number and the missed phone number;
    initiating an indication that the missed phone call is assigned to the one physical button, wherein the indication includes an illumination of the one physical button, a display of the missed phone number on a display screen of the phone apparatus, and an identification, at the display screen, of the one physical button assigned to the missed phone number;
    detecting a single selection of the one illuminated physical button; and initiating a phone call to the missed phone number in response to the detection of the single selection of the illuminated physical button.

8. The software of claim 7, further comprising:
accessing a mapping of phone numbers assigned to physical buttons; and
identifying, from the mapping, that the missed phone number has not been assigned to a physical button.

9. The software of claim 7, wherein the operation of identifying the missed phone number comprises receiving a message that includes the missed phone number from a telecommunication server.

10. The software of claim 7, wherein the physical button is a soft key.

11. The software of claim 7, wherein the physical button is mapped to a numerical input.

12. A method comprising:
associating each of a plurality of physical buttons of an apparatus with one of a plurality of phone numbers stored in the apparatus such that a single selection of a physical button initiates a phone call to the associated phone number;
detecting a missed phone call;
identifying a phone number associated with the missed phone call as a missed phone number;
determining that the missed phone call originated from a call control server different from a call control server associated with the apparatus;
identifying a prefix number associated with the apparatus;
appending the prefix number to the missed phone number;
dynamically assigning the missed phone number and the appended prefix to one of the physical buttons such that a single selection of the one physical button initiates a call to the prefix number and the missed phone number;
initiating an indication that the missed phone call is assigned to the one physical button, wherein the indication includes an illumination of the one physical button, a display of the missed phone number on the display screen, and an identification, at the display screen, of the one physical button assigned to the missed phone number;
detecting a single selection of the one illuminated physical button; and
initiating a phone call to the missed phone number in response to the detection of the single selection of the illuminated physical button.

13. The method of claim 12, further comprising:
accessing a mapping of phone numbers assigned to physical buttons; and
identifying, from the mapping, that the missed phone number has not been assigned to a physical button.

14. The method of claim 12, wherein the identification of the missed phone number comprises receiving a message that includes the missed phone number from a telecommunication server.

15. The method of claim 12, wherein the physical button is a soft key.

* * * * *